(12) United States Patent
Raghothaman et al.

(10) Patent No.: US 8,170,598 B2
(45) Date of Patent: May 1, 2012

(54) INFORMATION SHARING IN A PRIVATE ACCESS POINT NETWORK

(75) Inventors: Balaji Raghothaman, Hollis, NH (US); Deepak Das, Arlington, MA (US); Anand Srinivas, Cambridge, MA (US); Pierre A. Humblet, Cambridge, MA (US)

(73) Assignee: Airvana, Corp., Chelmsford, MA (US)

( * ) Notice: Subject to any disclaimer, the term of this patent is extended or adjusted under 35 U.S.C. 154(b) by 597 days.

(21) Appl. No.: 12/346,464

(22) Filed: Dec. 30, 2008

(65) Prior Publication Data

US 2010/0167771 A1    Jul. 1, 2010

(51) Int. Cl.
     *H04B 7/00*      (2006.01)
(52) U.S. Cl. ...................................... 455/522
(58) Field of Classification Search .................. 455/522
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |

(Continued)

*Primary Examiner* — Lincoln Donovan
*Assistant Examiner* — Daniel Rojas
(74) *Attorney, Agent, or Firm* — Fish & Richardson P.C.

(57) ABSTRACT

This description relates to information sharing in a private access point network.

26 Claims, 5 Drawing Sheets

U.S. PATENT DOCUMENTS

| | | |
|---|---|---|
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2010/0167771 A1 | 7/2010 | Raghothaman et al. |

INFORMATION SHARING IN A PRIVATE ACCESS POINT NETWORK

FIELD

This description relates to information sharing in a private access point network.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In general, in some aspects, a method includes transmitting signals at a first transmit power from a first private access point in a wireless communication network. The first transmit power corresponds to a first transmit power value. The method also includes receiving a second transmit power value at the first private access point. The second transmit power value is indicative of a second transmit power of a second private access point in the wireless communication network. The method also includes determining the first transmit power value at the first private access point using at least the second transmit power value.

Implementations may include one or more of the following features.

In the method, determining the first transmit power value may include updating the first transmit power value to produce an updated first transmit power value. In the method, transmitting the signals may include transmitting the signals at an updated first transmit power. The updated first transmit power may correspond to the updated first transmit power value.

In the method, receiving the second transmit power value may include receiving the second transmit power value from at least one of the second private access point or a private access point server.

The method may also include determining a first received power value by measuring a first received power at the first private access point. The first received power may be due to a first noise. The first noise may include a first ambient noise and a first interference power received from a macro access point. The method may also include sending the first transmit power value and the first received power value to at least one of the second private access point or a private access point server. The first transmit power value may be indicative of the first transmit power.

The method may also include determining a first received power value by measuring a first received power at the first private access point. The first received power may be due to a first noise. The first noise may include a first ambient noise and a first interference power received from a macro access point. In the method, determining the first transmit power value may include determining an initial first transmit power value using the first received power value; and updating the initial first transmit power value using at least the second transmit power value.

The method may also include determining a first received power value by measuring a first received power at the first private access point. The first received power may be due to a first noise. The first noise may include a first ambient noise and a first interference power received from a macro access point. In the method, determining the first transmit power value may include determining a pathloss value using at least the second transmit power value. The pathloss value may be an estimate of a pathloss between the second private access point and the first private access point. The method, determining the first transmit power value may also include selecting the first transmit power value using at least one of the pathloss value, the second transmit power value, or the first received power value. The method may also include receiving a second received power value at the first private access point. The second received power value may be indicative of a second received power received at the second private access point. The second received power may be due to a second noise. The second noise may include a second ambient noise and a second interference power received from the macro access point. In the method, selecting the first transmit power value may include selecting the first transmit power value using at least one of the pathloss value, the second transmit power value, the first received power value, or the second received power value.

The method may also include determining a first received power value by measuring a first received power at the first private access point. The first received power may be due to a first noise. The first noise may include a first ambient noise and a first interference power received from a macro access point. In the method, determining the first transmit power value may include determining a pathloss value using at least the second transmit power value. The pathloss value may be an estimate of a pathloss between the second private access point and the first private access point. The method, determining the first transmit power value may also include selecting the first transmit power value using at least one of the pathloss value, the second transmit power value, or the first received power value. In the method, selecting the first transmit power value may include attempting to increase a first signal to noise ratio at the first private access point and a second signal to noise ratio at the second private access point while attempting to reduce an interference seen by one or more access terminals that communicate with the macro access point. The interference may be due to the first private access point and the second private access point.

The method may also include determining a first received power value by measuring a first received power at the first private access point. The first received power may be due to a first noise. The first noise may include a first ambient noise and a first interference power received from a macro access point. In the method, determining the first transmit power value may include determining a pathloss value using at least the second transmit power value. The pathloss value may be an estimate of a pathloss between the second private access point and the first private access point. The method, determining the first transmit power value may also include selecting the first transmit power value using at least one of the pathloss value, the second transmit power value, or the first received power value. In the method, selecting the first transmit power value may include determining a first relationship between potential first transmit power values and potential first signal to noise ratio values for the first private access point. The first relationship may be determined using at least the pathloss value. In the method, selecting the first transmit power value may also include choosing at least the first transmit power value using at least the first relationship. The method may also include determining a second relationship between potential second transmit power values and potential second signal to noise ratio values for the second private access point. The second relationship may be determined using at least the pathloss value. The method may also include choosing at least the second transmit power value using at least the second relationship.

The method may also include determining a first received power value by measuring a first received power at the first private access point. The first received power may be due to a first noise. The first noise may include a first ambient noise and a first interference power received from a macro access point. In the method, determining the first transmit power value may include determining a pathloss value using at least the second transmit power value. The pathloss value may be an estimate of a pathloss between the second private access point and the first private access point. The method, determining the first transmit power value may also include selecting the first transmit power value using at least one of the pathloss value, the second transmit power value, or the first received power value. In the method, determining the pathloss value may include determining a second received power value at the first private access point. The second received power value may be associated with the second private access point. In the method, determining the pathloss value may also include determining the pathloss value using the transmit power value and the second received power value. In the method, determining the second received power value may include determining the second received power value by at least one of: measuring a second received power at the first private access point from the second private access point, or receiving the second received power value from an access terminal communicating with the first private access point in the wireless communication network. The received power value may be indicative of a third received power received by the access terminal from the second private access point.

In the method, the wireless communication network may be configured as at least one of a Code Division Multiple Access (CDMA) network or a Universal Mobile Telecommunications System (UMTS) network.

The method may also include receiving one or more other transmit power values at the first private access point. The one or more other transmit power values may be indicative of one or more other transmit powers of one or more other private access points in the wireless communication network, respectively. In the method, determining the first transmit power value may include determining the first transmit power value using at least the second transmit power value and the one or more other transmit power values.

In some aspects, a private access point in a wireless communication network includes a memory and one or more processing devices. The memory is configured to store instructions for execution. The one or more processing devices are configured to execute the instructions. The instructions are for causing the one or more processing devices to transmit signals at a first transmit power from the first private access point. The first transmit power corresponds to a first transmit power value. The instructions are also for causing the one or more processing devices to receive a second transmit power value at the first private access point. The second transmit power value is indicative of a second transmit power of a second private access point in the wireless communication network. The instructions are also for causing the one or more processing devices to determine the first transmit power value at the first private access point using at least the second transmit power value.

Implementations may include one or more of the following features.

In the private access point, the instructions may include instructions for causing the one or more processing devices to determine a first received power value by measuring a first received power at the first private access point. The first received power may be due to a first noise. The first noise may include a first ambient noise and a first interference power received from a macro access point. In the private access point, determining the first transmit power value may include determining a pathloss value using at least the second transmit power value. The pathloss value may be an estimate of a pathloss between the second private access point and the first private access point. In the private access point, determining the first transmit power value may also include selecting the first transmit power value using at least one of the pathloss value, the second transmit power value, or the first received power value.

In some aspects, one or more computer-readable media store executable instructions. The one or more computer-readable media include tangible media. The instructions are for causing one or more processing devices to transmit signals at a first transmit power from a first private access point in a wireless communication network. The first transmit power corresponds to a first transmit power value. The instructions are also for causing the one or more processing devices to receive a second transmit power value at the first private access point. The second transmit power value is indicative of a second transmit power of a second private access point in the wireless communication network. The instructions are also for causing the one or more processing devices to determine the first transmit power value at the first private access point using at least the second transmit power value.

Implementations may include one or more of the following features.

In the one or more computer-readable media, determining the first transmit power value may include attempting to increase a first signal to noise ratio at the first private access point and a second signal to noise ratio at the second private access point while attempting to reduce an interference seen by one or more access terminals that communicate with the macro access point, the interference being due to the first private access point and the second private access point.

In general, in some aspects, a method includes determining, at a first private access point in a wireless communication network, an interference value. The interference value is indicative of an interference generated at a second private access point in the wireless communication network by an access terminal. The access terminal is in communication with the first private access point. The method also includes determining, at the first private access point, a combined interference value using the interference value. The combined interference value corresponds to the second private access point. The method also includes sending the combined interference value to at least one of the second private access point or a private access point server.

Implementations may include one or more of the following features.

The method may also include determining, at the first private access point, a second interference value. The second interference value may be indicative of a second interference generated at the second private access point by a second access terminal. The second access terminal may be in communication with the first private access point. In the method, determining the combined interference value may include determining, at the first private access point, the combined interference value using the interference value and the second interference value.

In the method, determining the combined interference value may include using the interference value as the combined interference value.

In some aspects, a private access point in a wireless communication network includes a memory and one or more processing devices. The memory is configured to store instructions for execution. The one or more processing devices are configured to execute the instructions. The instructions are for causing the one or more processing devices to determine, at the first private access point, an interference value. The interference value is indicative of an interference generated at a second private access point in the wireless communication network by an access terminal. The access terminal is in communication with the first private access point. The instructions are also for causing the one or more processing devices to determine, at the first private access point, a combined interference value using the interference value, the combined interference value corresponding to the second private access point. The instructions are also for causing the one or more processing devices to send the combined interference value to at least one of the second private access point or a private access point server.

In some aspects, one or more computer-readable media store executable instructions. The one or more computer-readable media include tangible media. The instructions are for causing one or more processing devices to determine, at a first private access point in a wireless communication network, an interference value. The interference value is indicative of an interference generated at a second private access point in the wireless communication network by an access terminal. The access terminal is in communication with the first private access point. The instructions are also for causing the one or more processing devices to determine, at the first private access point, a combined interference value using the interference value. The combined interference value corresponds to the second private access point. The instructions are also for causing the one or more processing devices to send the combined interference value to at least one of the second private access point or a private access point server.

In general, in some aspects, a method includes receiving, at a first private access point in a wireless communication network, a combined interference value from at least one of a second private access point in the wireless communication network or a private access point server. The combined interference value corresponds to the first private access point. The method also includes determining, at the first private access point, a first total interference value using the combined interference value. The method also includes measuring, at the first private access point, a second total interference value. The method also includes determining, at the first private access point, a third interference value using the first total interference value and the second total interference value. The third interference value is indicative of a first noise.

Implementations may include one or more of the following features.

The method may also include receiving, at the first private access point, a second combined interference value from at least one of a third private access point or the private access point server. The second combined interference value may correspond to the first private access point. In the method, determining the first total interference value may include determining, at the first private access point, the first total interference value using the combined interference value and the second combined interference value.

In the method, the combined interference value may be determined at the second private access point using an interference value also determined at the second private access point. The interference value may be indicative of an interference generated at the first private access point by an access terminal. The access terminal may be in communication with the second private access point.

The method may also include determining, at the first private access point, an interference value. The interference value may be indicative of an interference generated at the second private access point by an access terminal. The access terminal may be in communication with the first private access point. The method may also include determining, at the first private access point, a second combined interference value using the interference value. The second combined interference value may correspond to the second private access point. The method may also include sending the second combined interference value to at least one of the second private access point or the private access point server.

In the method, the first noise may include a first ambient noise and a first interference power received from at least one macro access terminal. The macro access terminal may be in communication with a macro access point. In the method, determining the third interference value may include determining, at the first private access point, the third interference value by subtracting the first total interference value from the second total interference value.

The method may also include determining, at the first private access point, an ambient noise value. The method may also include determining, at the first private access point, a macro access terminal interference value by subtracting the ambient noise value from the third interference value.

The method may also include, responsively to determining the third interference value, sending a command from the first private access point to an access terminal, the access terminal being in communication with the first private access point, the command being configured to cause the access terminal to adjust a reverse link transmit power of the access terminal.

The method may also include, responsively to determining the third interference value, determining, at the first private access point, whether a macro access terminal is present in a communication range of the first private access point. The method may also include, if the macro access terminal is present, the macro access terminal having a communication session with a macro access point, initiating a hand-off of the communication session to the first private access point.

In the method, determining the first total interference value may include using the combined interference value as the first total interference value.

In some aspects, a private access point in a wireless communication network includes a memory and one or more processing devices. The memory is configured to store instructions for execution. The one or more processing devices are configured to execute the instructions. The instructions are for causing the one or more processing devices to receive, at the first private access point, a combined interference value from at least one of a second private access point in the wireless communication network or a private access point server. The combined interference value corresponds to the first private access point. The instructions are also for causing the one or more processing devices to determine, at the first private access point, a first total interference value using the combined interference value. The instructions are also for causing the one or more processing devices to measure, at the first private access point, a second total interference value. The instructions are also for causing the one or more processing devices to determine, at the first private access point, a third interference value using the first total interference value and the second total interference value. The third interference value is indicative of a first noise.

In some aspects, one or more computer-readable media store executable instructions. The one or more computer-readable media include tangible media. The instructions are for causing one or more processing devices to receive, at a first private access point in a wireless communication network, a combined interference value from at least one of a second private access point in the wireless communication network or a private access point server. The combined interference value corresponds to the first private access point. The instructions are also for causing the one or more processing devices to determine, at the first private access point, a first total interference value using the combined interference value. The instructions are also for causing the one or more processing devices to measure, at the first private access point, a second total interference value. The instructions are also for causing the one or more processing devices to determine, at the first private access point, a third interference value using the first total interference value and the second total interference value. The third interference value is indicative of a first noise.

The foregoing methods may be implemented as one or more computer-readable media storing instructions that are executable on one or more processing devices to implement the methods. The foregoing methods may be implemented by one or more processing devices on one or more computing devices. The foregoing methods may be implemented as a computer program product comprised of instructions that are stored on one or more computer-readable media, and that are executable on one or more processing devices. The foregoing methods may be implemented as an apparatus or system that includes one or more processing devices and memory to store executable instructions to implement the methods. For example, the foregoing methods may be implemented as a private access point that includes one or more processing devices and memory to store executable instructions to implement the methods. For example, the foregoing methods may be implemented by a system that includes, e.g., a private access point and a private access point server, the system including one or more processing devices and memory to store executable instructions to implement the methods.

The details of one or more examples are set forth in the accompanying drawings and the description below. Further features, aspects, and advantages will become apparent from the description, the drawings, and the claims.

DETAILED DESCRIPTION

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network. The communications link between an access terminal and an access point may be described in terms of separate directional portions. For example, the link from the access point to the access terminal may be referred to as the reverse link (reverse link), while the link from the access terminal to the access point may be referred to as the forward link.

Figure 1:
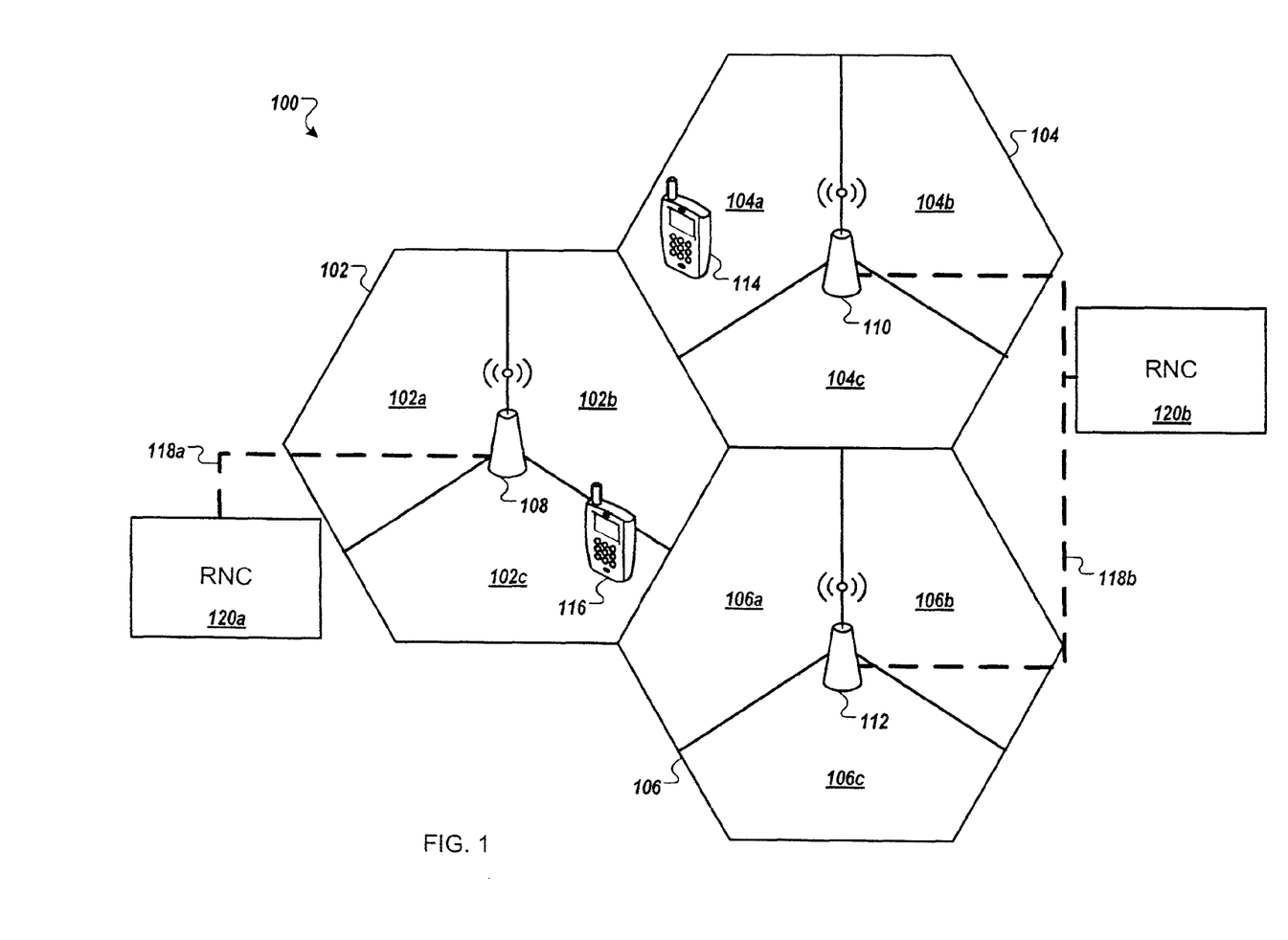
FIG. 1 is a diagram illustrating an example wireless network.

Referring to FIG. 1, a radio access network (RAN) 100 includes multiple macro access points or "macrocells" 108, 110, and 112 located in macrocell areas 102, 104, and 106, respectively. Each macrocell area is often further divided into sectors 102a-c, 104a-c, 106a-c, respectively, by using multiple sectorized antennas at the macrocells. The macrocell areas 102, 104, and 106 may include one or more private access points or "femtocells". The macro access points 108, 110, and 112 are each configured to communicate with an access terminal over an airlink. For example, the macro access point 108 may communicate with access terminal (AT) 116, while the macro access point 110 may communicate with AT 114. The macro access points 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

Figure 2:
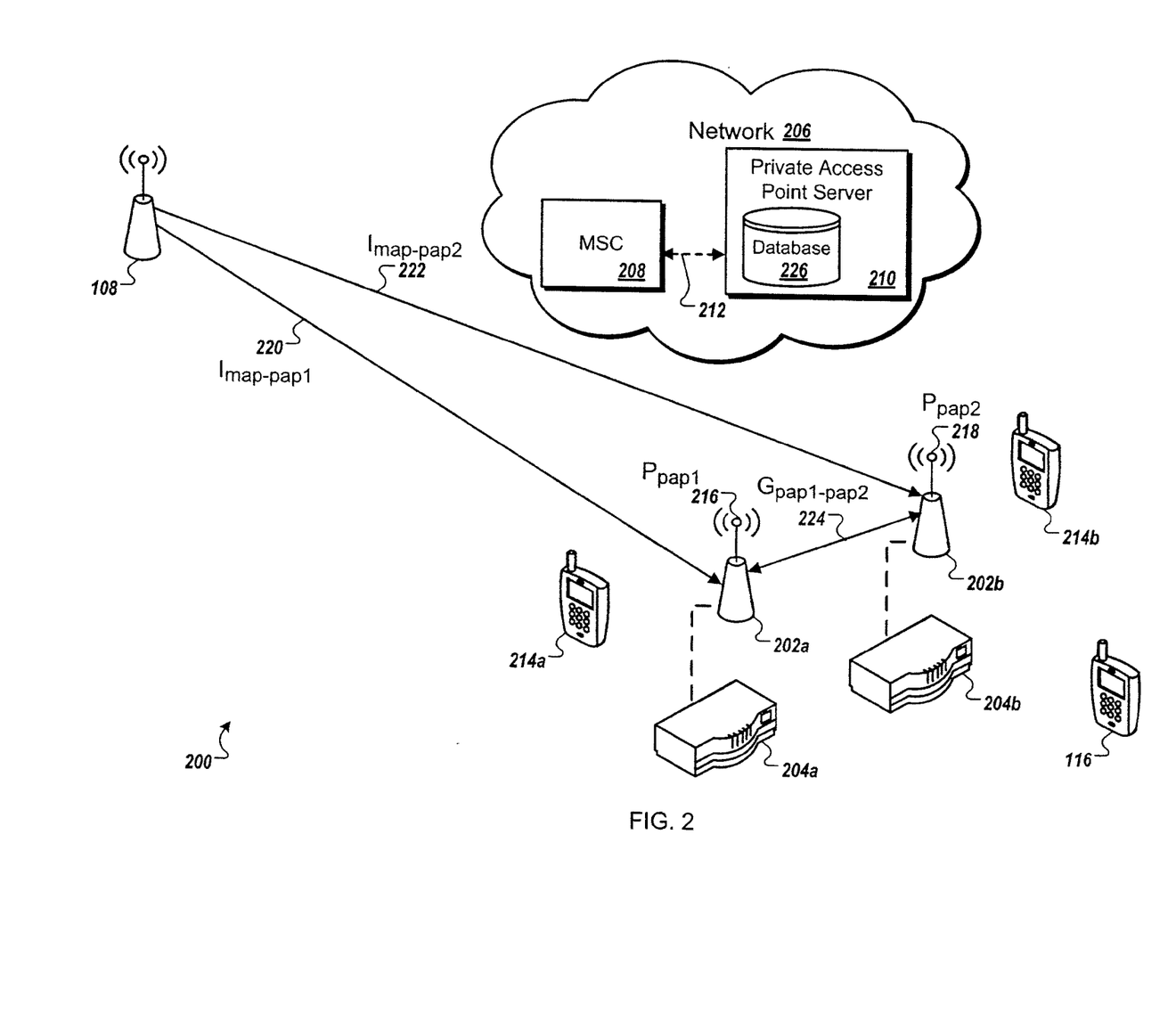
FIG. 2 is a diagram illustrating an example wireless network with two private access points deployed within range of a macro access point.

A radio network access point may be deployed in a home, an office, a public space, or a restaurant in a similar manner as a WiFi® access point. Such a radio network access point is referred to as a private access point. A set of private access points 202a and 202b, as shown in FIG. 2, may be deployed within the range of the macro access point 108 in a wireless communication network 200. For example, the private access points 202a and 202b may be arranged within the sector 102c of the cell 102 (as shown in FIG. 1). There may be any number of private access points 202 within the range of the macro access point 108 (e.g., hundreds, thousands, tens of thousands). Each private access point 202 may be identified, in part, by a code space allocation pseudo-noise code (e.g., PN offset value). Each private access point 202a-n may be connected to an available high-speed internet connection, such as a DSL or cable modem 204a and 204b, as the backhaul with the RNC functionality implemented in each private access point 202a and 202b. The private access points 202a and 202b may include, for example, femtocells or picocells. In some examples, a private access point may be integrated into a cable modem or other network hardware, such as a router or WiFi access point.

Private access points, such as private access points 202a, 202b, may be dynamically deployed (e.g., mobile or local, but without a "fixed" location known by the RAN 100 or the service provider's core network 122). Private access points may be self-organizing without exchanging information with neighboring access points. Noise and interference caused by a private access point may impact neighboring network-side devices such as other private access points and access terminals.

Figure 4:
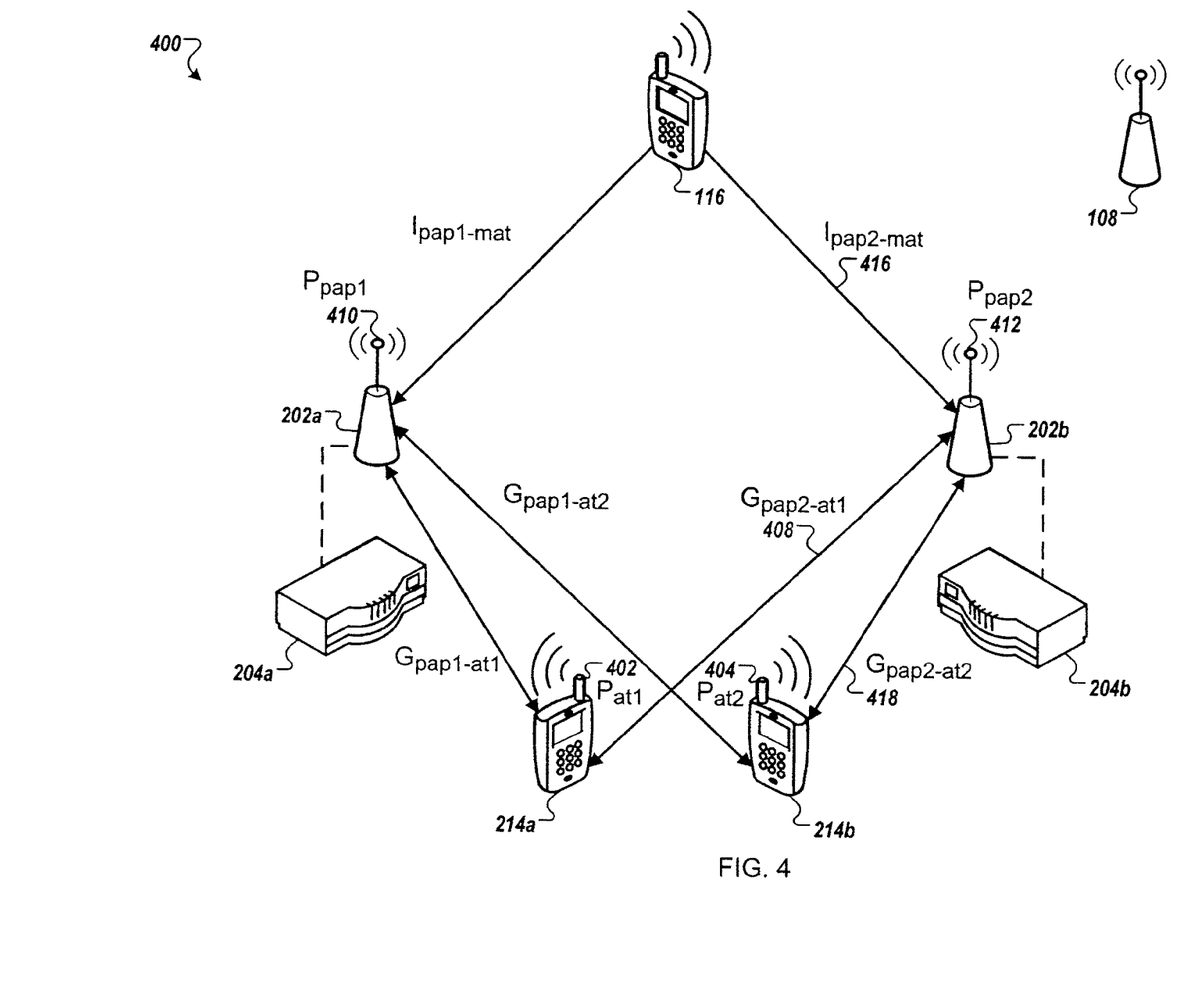
FIG. 4 is a diagram illustrating an example wireless network, including two private access points and three access terminals deployed within range of a macro access point.

The RAN 100 shown in FIG. 1, and the wireless communication networks 200, 400 shown in FIGS. 2 and 4 may use a 1xRTT protocol and/or an EV-DO protocol to transmit voice and data packets between an access terminal (AT), e.g., access terminals 114, 116, and a radio network access point, e.g., macro access points 108, 110, 112, or private access points 202a and 202b. Although this description uses terminology from the 1xRTT ("1x") and EV-DO ("DO") air interface standards in CDMA (Code Division Multiple Access) networks, the same concepts are applicable to other communication methods, including UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

In some implementations, private access point systems may perform some type of closed access control. Closed access control means, e.g., that access to each private access point is limited in some fashion. For example, not every access terminal may utilize the services of a particular private access point.

In some implementations, the owner of a private access point may choose to control which access terminals are allowed to utilize the services of that private access point. Individual access terminals may be "authorized" or "not authorized" ("unauthorized") to use the services of the private access point. The private access point, for example, may include an authorization list, or "access control list", which may be stored in memory on the private access point. The access control list for a particular private access point may include identification information of any authorized access terminals. Access terminals that are not identified on the access control list of a particular private access point are not authorized on that private access point. A particular access terminal may be authorized on one private access point and unauthorized on another private access point. Just as a private access point may identify more than one authorized access terminal in its access control list, an access terminal may be authorized on more than one private access point.

When an authorized access terminal 214a or 214b is present within range of a private access point (e.g., the private access point 202a or 202b), it may use the private access point rather than a regular cellular radio network access point, such as the macro access point 108, to place or receive voice calls and data connections, even if the access terminal is otherwise within the cell region for the cellular radio network access point. When the access terminal 214a is communicating, for example, with the private access point 202a, the access terminal 214a may be referred to as a private access point access terminal, or private access terminal. The access terminal 214a may be referred to as a macro access terminal when it is engaging in communication with the macro access point 108. Some access terminals (e.g., the access terminal 116) may not be authorized to communicate with any of the private access points 202.

We sometimes refer to the macro access point 108 as a standard access point or macro BTS to distinguish the macro access point 108 from a private access point, as the macro access point 108 provides direct access to a wider core network 206 (e.g., radio access network). For example, the macro access point 108 may provide a communication link to a mobile switching center (MSC) 208 within the network 206. The MSC 208 may coordinate mobility management for active communication sessions (e.g., voice calls, data transfers, etc.) of the access terminals within the wireless network 200. The MSC 208 may also enable access terminals to establish communication links with other devices and systems (e.g., a Plain Old Telephone System (POTS)) to engage in communication sessions.

A private access point server 210 may provide storage for PN offset assignments or scrambling code assignments as well as and other functions such as tracking the location of the private access points 202. In some implementations, the private access point server 210 may assign appropriate PN offsets to each private access point 202, for example based upon the strength of signals (with PN offsets) in the vicinity of the individual private access point 202. For example, a PN offset may be assigned that corresponds to a relatively weak signal (that includes the PN offset) or an offset that is not observed to be associated with any signals in proximity of the individual private access point 202. Along with storing data representing available PN offsets and PN offset assignments, the private access point server 210 may also store other information (e.g., private access point location information, private access point capabilities, private access point transmit power level, private access point maximum transmit power level, etc.).

The private access point server 210, in some implementations, may store one or more pieces of this information within a database 226 for later retrieval. The database 226, for example, may include one or more storage devices designed into the hardware of the private access point server 210 or accessible to the private access point server 210 (e.g., using a direct connection or a remote connection through the network 206).

The private access point server 210 and the MSC 208 are connected by a network communication link 212. In some examples, the MSC 208 and the private access point server 210 may be co-located within the same room or integrated within the same piece of equipment.

In the following discussion with respect to, e.g., FIG. 2, $P_{pap1}$ and $P_{pap2}$ refer to the forward link transmit power values of the private access points 202a and 202b, respectively; $G_{pap1\text{-}pap2}$ refers to the path gain between the private access point 202a and the private access point 202b; and $I_{map\text{-}pap1}$ and $I_{map\text{-}pap2}$ refer to the noise and macro interference signals as experienced at the private access points 202a and 202b, respectively.

Generally, e.g., a pathloss over a signal path between two communicating entities is the multiplicative inverse of the path gain over the signal path between the entities, and vice versa. In some implementations, a pathloss value may include, e.g., an estimate or measurement of a pathloss. In some implementation, a pathloss value may be determined from, or may include, e.g., an estimate or measurement of a path gain.

Within the following examples, although the discussion is represented in terms of path gain value(s), the examples may easily be applied to, and represented in terms of, pathloss value(s).

Activation of a Private Access Point and Establishing an Operating Range

Upon activation, the private access point 202a ("pap1") may initialize a forward link transmit power value $P_{pap1}$ 216. Although the forward link transmit power value $P_{pap1}$ 216 is described as a single value for sake of simplicity, depending upon the communication standard used, the forward link transmit power value $P_{pap1}$ 216 may be the sum of individual transmit power values. For example, using the EV-DO standard, the forward link transmit power value $P_{pap1}$ 216 includes a single value. Within, e.g., the UMTS and 1xRTT standards, however, the forward link transmit power value $P_{pap1}$ 216 may be separated into a pilot power value and a maximum total power value. The multiple data channel power values may typically be expressed in terms relative to the pilot power value, and the sum of all data channel power values may not exceed the maximum total power value.

The forward link transmit power value $P_{pap1}$ 216, for example, may be based in part upon a target signal-to-noise ratio (SNR). In terms of the following discussion, the SNR (at, e.g., the private access point 202a) may be considered to be approximated by a forward link transmit power value (e.g., $P_{pap1}$ 216) divided by the sum of the interference at the access point (e.g., private access point 202a) and the noise as perceived at the access point (e.g., private access point 202a; e.g., $SNR=P_{pap1}/(I_{pap1}+N)$). In some examples, the target SNR may be set by an operator of the private access point 202a (e.g., through device settings), by a manufacturer of the private access point 202a (e.g., within hardware or as a system default software setting), or by the private access point server 210 (e.g., during network initialization). The SNR setting, for example, may be indicative of a target operating range (e.g., in decibel (dB) pathloss). The SNR setting may be based, in part, upon the deployment of the private access point 202a. For example, a private access point deployed within a small urban apartment may require a smaller operating range than a private access point deployed within a suburban house.

To determine the forward link transmit power value $P_{pap1}$ 216 which comes closest to delivering the target SNR, the private access point 202a may detect the levels of noise and interference within proximity. For example, the private access point 202a may measure the signal strength of the macro access point 108 as perceived at the private access point 202a, also stated as the interference from the macro access point 108 ("map") at the private access point 202a (e.g., along a path of interference $I_{map-pap1}$ 220). The private access point 202a may set the forward link transmit power value $P_{pap1}$ 216 to achieve the SNR setting or target SNR in view of the interference $I_{map-pap1}$ 220.

In one example, an operator may set a target SNR of 100 dB for the private access point 202a. For an SNR of 100 dB, the received SNR of an access terminal (e.g., the access terminal 214a) located at a 100 dB pathloss from the private access point 202a is 0 dB. The private access point 202a, upon initialization, may measure a received signal strength of −100 dBm (e.g., power ratio of decibels referenced by milliwatt) from the macro access point 108 along the path of interference $I_{map-pap1}$ 220. Throughout the following discussion it is assumed that the interference caused by the macro access point 108 dominates the ambient thermal noise at the private access point (e.g., private access point 202a), and the ambient thermal noise is thereby neglected in the following examples. By adding the macro access point received signal strength (e.g., −100 dBm) to the target SNR (e.g., 100 dB), the private access point 202a estimates the forward link transmit power value $P_{pap1}$ 216 of 0 dBm. When the forward link transmit power value $P_{pap1}$ 216 is set to 0 dBm, the SNR of the private access point 202a is approximately 100 dB (e.g., not taking into account noise due to other network elements within proximity of the private access point 202a).

At some time after the private access point 202a has initialized with the forward link transmit power value $P_{pap1}$ 216 of 0 dBm, the private access point 202b becomes activated. The private access point 202b ("pap2") also has a target SNR setting of 100 dB. The private access point 202b measures the received signal strength from the macro access point 108 along a path of interference $I_{map-pap2}$ 222 as −90 dBm and the received signal strength from the private access point 202a as −80 dBm. Because the received signal strength from the private access point 202a is more significant than the received signal strength from the macro access point 108, the received signal strength from the macro access point 108 may be ignored.

To achieve the target SNR setting of 100 dB, the private access point 202b determines a forward link transmit power value $P_{pap2}$ 218 of 20 dBm by adding −80 dBm (e.g., the received signal strength from the private access point 202a) to 100 dB (e.g., the target SNR setting).

The target forward link transmit power value $P_{pap2}$ 218 of 20 dBm may be beyond the physical capability of the private access point 202b. In one example, the maximum forward link transmit power value $P_{pap2}$ 218 may be 10 dBm. In this case, the private access point 202a may choose to maximize the forward link transmit power value $P_{pap2}$ 218 to 10 dBm to achieve an SNR of slightly below 90 dBm.

However, the private access point 202a may now experience significant interference from the private access point 202b. Assuming that a path gain $G_{pap1-pap2}$ 224 between the private access point 202a and the private access point 202b is equivalent in either direction, the private access point 202a may experience a received signal strength from the private access point 202b of approximately −70 dBm (e.g., the received signal strength measured between the private access point 202a and the private access point 202b of −80 dBm added to the forward link transmit power value $P_{pap2}$ 218 of the private access point 202b of 10 dBm). At the present forward link transmit power value $P_{pap1}$ 216 of the private access point 202a (e.g., 0 dB), the SNR at the private access point 202a is approximately 70 dB.

In this example, the private access points 202a, 202b have entered into a power race. When this occurs, both private access points 202a, 202b may ultimately operate at the maximum forward link transmit power values $P_{pap1}$ 216, $P_{pap2}$ 218 (e.g., 10 dBm, 20 dBm, etc.). The private access point 202a, in response to detecting the increased noise produced by the higher forward link transmit power value $P_{pap2}$ 218 on the private access point 202b, may increase the forward link transmit power value $P_{pap1}$ 216 from 0 dB to 10 dB to achieve an SNR of approximately 80 dB. This in turn reduces the SNR at the private access point 202a to approximately 80 dB.

Cooperating with Neighboring Private Access Points while Establishing an Operating Range When both of the private access points 202a, 202b are transmitting at maximum power, there may be greater potential for the private access points 202a, 202b to cause a significant amount of interference to any macro access terminals (e.g., the access terminal 116) within proximity of the private access points 202a, 202b. At the same time, the private access points 202a, 202b may not necessarily be functioning at the optimum forward link transmit power values $P_{pap1}$ 216, $P_{pap2}$ 218. It may be desirable to determine the forward link transmit power values $P_{pap1}$ 216, $P_{pap2}$ 218 for both of the private access points 202a, 202b which may provide an optimization of system performance, power efficiency, and fairness. System performance may include achieving a resulting SNR at each private access point 202a, 202b which approaches the target SNR setting of each private access point 202a, 202b. Power efficiency may include a result in which neither of the private access points 202a, 202b is transmitting at unnecessarily high power levels. Fairness may include a result in which neither of the private access points 202a, 202b may gain greater coverage (e.g., SNR dB range) at the expense of the other private access point 202a, 202b.

Sharing Transmit Power Values Between Neighboring Private Access Points Via, E.G., Communication Between Private Access Points and/or Communication to and from a Private Access Point Server In a second example, return to the circumstance in which the private access point 202a has initialized with a forward link transmit power value $P_{pap1}$ 216 of 0 dBm. Upon activation, the private access point 202b measures the received power of −80 dBm from the private access point 202a. The private access point 202b may also learn that the private access point 202a is operating with the forward link transmit power value $P_{pap1}$ 216 of 0 dBm. Based upon this information, the private access point 202b may estimate that the path gain $G_{pap1\text{-}pap2}$ 224 between the private access point 202b and the private access point 202a is 80 dB.

In some implementations, rather than receiving the total forward link transmit power value $P_{pap1}$ 216 of the private access point 202a, the private access point 202b may learn the forward link pilot power value portion of the forward link transmit power value $P_{pap1}$ 216. For example, in the circumstance of the EV-DO or CDMA standard, the forward link pilot power value alone contributes to the path gain estimation.

In some implementations, when the private access point 202a initializes the forward link transmit power value $P_{pap1}$ 216, the private access point 202a may provide the forward link transmit power value $P_{pap1}$ 216 to the private access point server 210 (e.g., to be stored within a private access point parameter database such as the database 226 of FIG. 2). The private access point 202b may later request this information from the private access point server 210. In other implementations, the private access points 202a, 202b may communicate forward link transmit power values $P_{pap1}$ 216, $P_{pap2}$ 218 directly. For example, the private access points 202a, 202b may communicate through a point-to-point internet protocol (IP) connection or through one or more IP multicasting techniques (e.g., over the high-speed internet connection, such as the DSL or cable modem 204a and 204b). In another example, the private access points 202a, 202b may communicate the information by wireless broadcast (e.g., using the UMTS pilot power broadcast mechanism). Other communication techniques are possible.

In some implementations, the private access point 202b may apply a threshold value to the path gain $G_{pap1\text{-}pap2}$ 224 to determine whether or not the private access point 202a is within close proximity. For example, a threshold value of 90 dB may indicate that the private access point 202a and the private access point 202b are deployed within close proximity. Once, e.g., the two private access points 202a, 202b are determined to be within close proximity, it may be desirable to attempt to reduce the interference between the private access point 202a and the private access point 202b.

Having learned that the private access point 202a is operating with the forward link transmit power value $P_{pap1}$ 216 of 0 dBm, for the sake of fairness, the private access point 202b may choose to operate at the forward link transmit power value $P_{pap2}$ 218 of 0 dBm as well. Based upon this information, for example, setting the forward link transmit power value $P_{pap2}$ 218 lower than 0 dBm may mean sacrificing signal strength to the neighboring private access point 202a. Increasing the forward link transmit power value $P_{pap2}$ 218 to a higher value than 0 dBm may initiate a power race as described in the previous example, in which neither of the private access points 202a, 202b were provided with information regarding the other's forward link transmit power value. In this case, both of the private access points 202a, 202b, operating with the forward link power values $P_{pap1}$ 216, $P_{pap2}$ 218 of 0 dBm, have an SNR of approximately 80 dB. The 0 dBm forward link transmit power setting, however, was originally based upon the interference $I_{map\text{-}pap1}$ 220 of the macro access point 108 at the private access point 202a. Now that both of the private access points 202a, 202b are activated within close proximity, the effect of the interference $I_{map\text{-}pap1}$ 220, $I_{map\text{-}pap2}$ 222 from the macro access point 108 may generally be negligible by comparison. In other words, the forward link transmit power values $P_{pap1}$ 216, $P_{pap2}$ 218 of 0 dBm, although fair to each party, are arbitrarily set with regards to the primary source of interference detected by each private access point 202a, 202b. Through communication of the transmit power value settings between the neighboring private access points 202a and 202b (via, e.g., communication between the private access points 202a, 202b and/or communication to and/or from the private access point server 210), the forward link transmit power values of each private access point 202a, 202b have been set while avoiding a power race. However, other techniques for establishing forward link transmit power values may involve considering the effect of interference between the neighboring private access points 202a, 202b.

Sharing Transmit Power Values and Interference Values Between Neighboring Private Access Points Via, E.G., Communication Between Private Access Points and/or Communication to and from a Private Access Point Server In a third example, return to the circumstance in which the private access point 202b learns that the forward link transmit power value $P_{pap1}$ 216 for the private access point 202a is 0 dBm. In addition to this information, the private access point 202b now may learn (e.g., through the private access point server 210 or one of the direct communication methods previously described) the interference $I_{map\text{-}pap1}$ 220 of the macro access point 108 at the private access point 202a (e.g., the signal strength of the macro access point 108 as measured at the private access point 202a). By considering the effect of noise created by the macro access point 108 in addition to the noise produced by interference between the two private access points 202b, the forward link transmit power values $P_{pap1}$ 216, $P_{pap2}$ 218 may be individually adjusted for the mutual benefit of each private access point 202a, 202b (e.g., by evening out the SNR coverage for each private access point 202a, 202b). Although the private access points 202a, 202b are within close proximity, the interference $I_{map\text{-}pap1}$ 220, $I_{map\text{-}pap2}$ 222 of the macro access point 108 as detected by each private access point 202a, 202b may vary considerably (e.g., due to physical barrier, etc.).

Consider that the private access point 202a may measure the interference $I_{map\text{-}pap1}$ 220 at −100 dBm. As in the second example, the private access point 202b may determine the path gain $G_{pap1\text{-}pap2}$ 224 between the private access points 202a, 202b as 80 dB. The private access point 202b may additionally measure the interference $I_{map\text{-}pap2}$ 222 as −90 dBm. In combining this information, the private access point 202b may determine individually adjusted forward link transmit power values $P_{pap1}$ 216, $P_{pap2}$ 218 for both the private access point 202a and the private access point 202b (e.g., forward link transmit power values which minimize interference while maximizing SNR). The individually adjusted forward link transmit power values $P_{pap1}$ 216, $P_{pap2}$ 218, in one example, may be determined to provide generally equivalent SNR coverage to each private access point 202a, 202b by taking into account the interference values $I_{map\text{-}pap1}$ 220, $I_{map\text{-}pap2}$ 222 at each private access point 202a, 202b. Using a power adjustment algorithm, for example, the private access point 202b may determine that by setting the forward link transmit power value $P_{pap2}$ 218 to −12 dBm while the private access point 202a sets the forward link transmit power value $P_{pap1}$ 216 to −10 dBm, the SNR for each private access point 202a, 202b may be set to approximately 77 dB while reducing the forward link transmit power values $P_{pap1}$ 216, $P_{pap2}$ 218 by greater than 10 dBm. Power adjustment algorithms will be described in greater detail below in relation to FIG. 3. The reductions in the forward link transmit power values $P_{pap1}$ 216, $P_{pap2}$ 218 may reduce the interference experienced by nearby macro ATs (e.g., the access terminal 116).

Equations for expressing the SNR in relation to the forward link transmit power value of a private access point (e.g., the $P_{pap1}$ 216), the interference between a private access point and a macro access point (e.g., the interference $I_{map-pap1}$ 220), the path gain between the private access point and a neighboring private access point (e.g., the path gain $G_{pap1-pap2}$ 224), and the forward link transmit power value of the neighboring private access point (e.g., the $P_{pap2}$ 218) may be estimated as follows:

$$SNR_1 = P_{pap1}/(I_{map-pap1} + G_{pap1-pap2} * P_{pap2})$$

$$SNR_2 = P_{pap2}/(I_{map-pap2} + G_{pap1-pap2} * P_{pap1})$$

Figure 3:
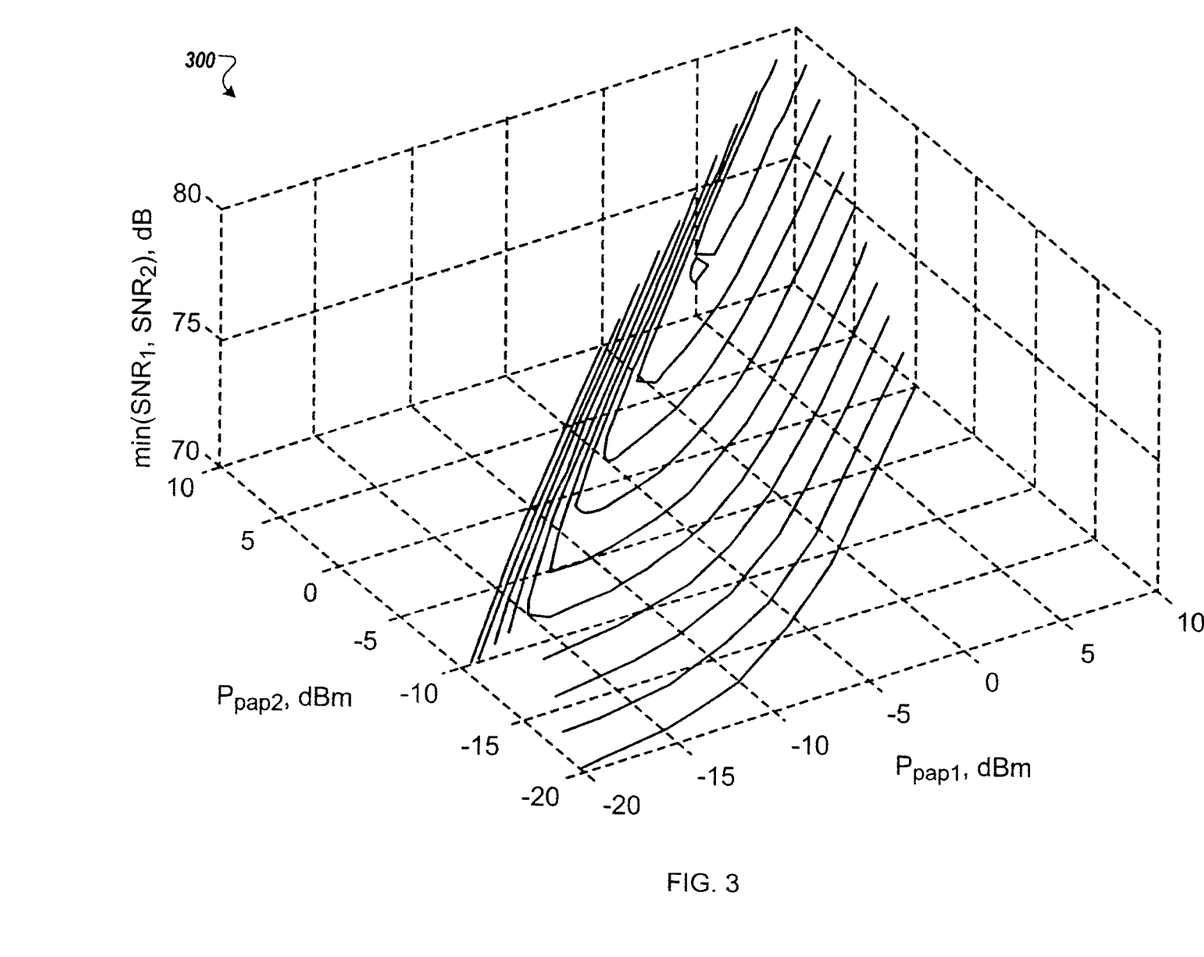
FIG. 3 is a three-dimensional graph.

FIG. 3 is a three-dimensional graph 300 showing min (SNR$_1$, SNR$_2$) versus the forward link transmit powers $P_{pap1}$ and $P_{pap2}$. As shown in the graph 300, when both of the forward link transmit powers $P_{pap1}$ 216 and powers $P_{pap2}$ 218 of the private access points 202a, 202b are at the maximum forward link transmit power value (e.g., 10 dBm), the approximate minimum SNR for the private access points 202a, 202b is slightly below 80 dB. By decreasing the forward link transmit powers $P_{pap1}$ 216 and powers $P_{pap2}$ 218 by approximately twenty decibels (e.g., to −9 and −10 dBM respectively), for example, the estimated SNR decreases by about two decibels, to approximately 78 dB.

Expanding the equations for SNR$_1$ and SNR$_2$ to consider any number of private access points in close proximity, let $P_{pap1}$ refer to the forward link transmit power value of the private access point i, $G_{papi-papj}$ refer to the path gain between the private access point i and the private access point j, and $I_{map-papi}$ refer to the noise and macro interference signal as experienced at the private access point i. To determine the total interference power signals from all sources, the following equation may be used:

$$I_i = I_{map-papi} + \Sigma_{j \ne i} P_{papj} G_{papj-papi}$$

To solve for the SNR based upon varying forward link transmit power values, the following equation may be used:

$$SNR_i = P_{pap1}/I_i$$

A variety of power adjustment algorithms may be generated based upon the above equation. In some implementations, a power adjustment algorithm may express the tradeoff between a reasonable SNR and the potential of interference to nearby network devices. For example, based upon the estimations provided within the examples of FIG. 2, the following function attempts to select a fair SNR (e.g., through the "min" function with the SNR expressed in dB and the forward link transmit powers in dBm) while controlling the relationship between SNR and forward link transmit power through the coefficient 0.36:

$$f_i(P_{papi}) = \min(SNR_1, SNR_2) + 0.36 * P_{papi}$$

The coefficient 0.36 may be used to control how many decibels the SNR is reduced by when the forward link transmit power is reduced by a single decibel. The coefficient 0.36 may help in further refining the selection of a fair SNR (e.g., along the curves of FIG. 3). In other implementations, an algorithm may be generated which varies based upon the achievable data rate rather than the SNR. For example, the achievable data rate may be considered a function of the SNR, depending upon the type of radio technology in use (e.g., UMTS, CDMA, etc.). In one example, following relation to data rate $R_i$ may be used:

$$R_i = \log 2(1 + \min(SNR_i, SNR_{max}))$$

In the above equation, $SNR_{max}$ may be considered to be the SNR value which approximates a fastest potential data rate supported by the private access point.

Using the example techniques described with respect to FIG. 2, the level of interference experienced by macro access terminals ("mats") caused by private access points may be reduced. Macro access terminals operating near a private access point, however, may continue to generate high levels of interference for the private access terminals served by the private access point. FIG. 4 is a diagram illustrating an example wireless network 400, including two private access points 202a, 202b and three access terminals 116, 214a, 214b deployed within range of a macro access point 108. For example, when a macro access terminal (e.g., the access terminal 116) is operating at an edge of the cell coverage (e.g., the cell 102 as shown in FIG. 1) of a macro access point (e.g., the macro access point 108), the macro access terminal may operate at a high reverse link transmit power value to reach the macro access point. The high reverse link transmit power value of the macro access terminal may, in turn, generate significant noise at one or more nearby private access points (e.g., the private access points 202a, 202b), thus interfering with or one or more private access terminals being served by the nearby private access points (e.g., the private access terminals 214a, 214b). This may cause the power of access terminals 214a, 214b to be increased to combat the interference, which in turn may generate even more reverse link interference. In an implementation, the private access points 202a and 202b may collaborate to approximate the interference caused by access terminal 116. The private access points 202, 202b may then consider the estimated interference measurement while setting the reverse link power values of access terminals 214a, 214b.

In the following discussion with respect to, e.g., FIG. 4, $P_{pap1}$ and $P_{pap2}$ refer to the forward link transmit power values of the private access points 202a and 202b, respectively; $P_{at1}$ and $P_{at2}$ refer to the reverse link transmit power values of the private access terminals 214a and 214b, respectively; $G_{pap1-at2}$ refers to the path gain between the private access terminal 214b and the private access point 202a; $G_{pap2-at1}$ refers to the path gain between the private access terminal 214a and the private access point 202b; and $I_{pap1-mat}$ and $I_{pap2-mat}$ refer to the noise and interference from the macro access terminal 116 as experienced at the private access points 202a and 202b, respectively.

In one example, consider that the private access terminal 214a ("at1") is served by the private access point 202a ("pap1") and the private access terminal 214b ("at2") is served by the private access point 202b ("pap2"). The private access point 202a may establish a reverse link transmit power value $P_{at1}$ 402 for the private access terminal 214a relative to the total interfering power as experienced at the private access point 202a. The total interfering power at the private access point 202a, for example, may include interference from the private access point 202b, the private access terminal 214b, or the macro access point 108. Similarly, the private access point 202b may establish a reverse link transmit power value $P_{at2}$ 404 for the private access terminal 214b relative to the total interfering power as experienced at the private access point 202b. The total interfering power at the private access point 202b, for example, may include interference from the private access point 202a, the private access terminal 214a, or the macro access point 108.

At a later point in time, the macro access terminal 116 ("mat") may enter the vicinity of the private access points 202a, 202b and the private access terminals 214a, 214b. Assume that the macro access terminal 116 is transmitting at a high reverse link transmit power value to communicate with the macro access point 108. The private access points 202a, 202b may recognize the increase in interference and decide to increase the reverse link transmit power values $P_{at1}$ 402, $P_{at2}$ 404 of the private access terminals 204a, 204b to maintain present data rate(s). The increase in the reverse link transmit power values $P_{at1}$ 402, $P_{at2}$ 404 may generate additional interference at the macro access point 108. The macro access terminal 116 may begin to operate at a higher reverse link transmit power value to compensate for the additional interference, or the macro access point 108 may reduce the data rate of the macro access terminal 116. In some implementations, the power race may continue until one or more of the access terminals 214a, 214b, or 116 are operating at the maximum reverse link transmit power value (e.g., specific to each device 214a, 214b, or 116). Although this example is posed in terms of a macro access terminal, interference caused by one or more private access terminals may trigger a similar power race.

Determining the Effect of Interference Generated by Access Terminals

A private access point may estimate the amount of interference generated at a neighboring private access point by each private access terminal served by the private access point and sum the results to determine the total quantity of interference at the neighboring private access point generated by all of the private access terminals being served by that private access point. By sharing this information, private access points within close proximity may determine the total interference generated by all private access terminals within the vicinity.

Determining the Effect of Interference of Private Access Terminals Upon Neighboring Private Access Point For example, the private access point 202a may request a measurement from the private access terminal 214a regarding the received signal strength from the private access point 202b as experienced at the access terminal 214a. The request may be embedded within a standard network communication message. The message, for example, may be a route update request as defined in the EV-DO protocol or a pilot strength measurement message (PSMM) as defined in the 1xRTT system protocol. The information contained within the message may include, for example, a PN offset value identifying the private access point 206b and a communication frequency associated with the private access point 202b.

The response to the measurement request may include a signal strength value $S_{pap2-at1}$. The signal strength $S_{pap2-at1}$ of the private access point 202b as perceived by the private access terminal 214a may be described by the following equation:

$$S_{pap2-at1} = P_{pap2} G_{pap2-at1}$$

The private access point 202a may also receive the forward link transmit power value $P_{pap2}$ 412 directly from the private access point 202b or from the private access point server 210 (e.g., as described in relation to the forward link transmit power value $P_{pap2}$ 218 in FIG. 2). By dividing the signal strength measurement received from the private access terminal 214a by the forward link transmit power value $P_{pap2}$ 412, the private access point 202a may estimate the path gain $G_{pap2-at1}$ 408 between the private access point 202b and the private access terminal 214a:

$$G_{pap2-at1} = S_{pap2-at1}/P_{pap2}$$

Now that the path gain $G_{pap2-at1}$ 408 has been determined, the interference experienced at the second private access point 202b due to the first private access terminal 214a, $I_{pap2-at1}$, may be estimated by multiplying the reverse link transmit power value $P_{at1}$ 402 by the path gain $G_{pap2-at1}$ 408 as shown by the following equation:

$$I_{pap2-at1} = P_{at1} * G_{pap2-at1}$$

Determining the Reverse Link Transmit Power Value of a Private Access Terminal

In some implementations, the reverse link transmit power value of one or more of the private access terminals (e.g., private access terminals 214a, 214b) may not be known. In this case, the reverse link transmit power value of the private access terminal may be derived by the private access point. If the private access terminal 214a and the private access point 202a are communicating using the UMTS standard, for example, the private access point 202a may issue a UMTS measurement report request to the private access terminal 214a. The response to the UMTS measurement report request from the private access terminal 214a includes the reverse link transmit power value $P_{at1}$ 402 of the private access terminal 214a.

If communicating in a standard other than UMTS, in some implementations, the private access point 202b may determine the reverse link transmit power value $P_{at2}$ 404 of the private access terminal 214b using a two-step method. First, the private access point 202b may request that the private access terminal 214b report the signal strength of the private access point 202b as detected at the private access terminal 214b. Based upon the reverse link transmit power value $P_{pap2}$ 412 of the private access point 202b, the private access point 202b may determine the path gain $G_{pap2-at2}$ 418 between the private access point 202b and the private access terminal 214b. The private access point 202b may measure the received signal strength from the private access terminal 214b. Using the value determined for the path gain $G_{pap2-at2}$ 418, the private access point 202b may derive the reverse link transmit power value $P_{at2}$ 404 of the private access terminal 214b.

After having determined the interference $I_{pap2-at1}$, (see the above equation), the private access point 202a may now share the determined interference $I_{pap2-at1}$ value with the private access point 202b (e.g., through the private access point server 210 or one of the direct communication methods previously described).

Combining Interference Estimates Received from Neighboring Private Access Points Via, E.G., Communication Between Private Access Points and/or Communication to and from a Private Access Point Server At the private access point 202b, the total interference $I_{pap2}$ may be defined as the sum of the noise and macro access terminal interference $I_{pap2-mat}$ and the private access terminal interference $I_{pap2-at1}$ as illustrated by the following equation:

$$I_{pap2} = I_{pap2-at1} + I_{pap2-mat}$$

In comparing the sum of the interference caused by the local private access terminal 214a to the total interference as measured at the private access point 202b, an estimate may be made of the interference caused by the macro access terminal 116. Because the total reverse link noise and interference $I_{pap2}$ is a known value at the private access point 202b, and the private access terminal interference $I_{pap2-at1}$ has been provided by the neighboring private access point 202a (e.g., directly or via the private access point server 210), the above equation may be solved for the noise and macro access terminal interference $I_{pap2-mat}$ 416 as follows:

$$I_{pap2-mat} = I_{pap2} - I_{pap2-at1}$$

Using this information, the private access point 202b may set the reverse link transmit power value $P_{at2}$ 404 of the private access terminal 214b in a way that takes expressly into account the presence of the interference from the macro access terminal 116, rather than, e.g., relying only on the total noise $I_{pap2}$.

The method described above may be generalized to any number of private access points and private access terminals. Let $P_{ati}$ stand for the reverse link transmit power value of the private access terminal $AT_i$, $G_{papn-ati}$ stand for the path gain between the private access terminal $AT_i$ and the private access point $PAP_n$, and $I_{papn-mat}$ stand for the noise and macro access terminal interference as experienced at the private access point $PAP_n$.

For each neighboring private access point $PAP_m$ of the private access point $PAP_n$, a sum of all interference from the private access terminals $AT_m$ being served by the neighboring private access point $PAP_m$ may be expressed as followed:

$$I_{papn-atm} = \Sigma_{i\_at\_served\_by\_papm} P_{ati} G_{papn-ati}$$

Each neighboring private access point $PAP_m$ may share this information with the private access point $PAP_n$. Using this information, the total noise and interference $I_{papn}$ at the private access point $PAP_n$ may be expressed by the following equation, which allows the private access points to determine the interference of the macro access terminal on the private access point ($I_{papn-mat}$):

$$I_{papn} = I_{papn-mat} + \Sigma_{j\_over\_all\_private\_ATs} P_{atj} G_{papn-atj}$$

In an implementation, a private access point such as the private access point 202a may estimate ambient noise at the private access point. In CDMA, access terminals are generally configured to go silent (i.e., not transmit) during so-called "silence intervals". The access terminals (and, e.g., the private access point 202a) may receive information regarding the silence intervals (duration and period) from a macro access point such as the macro access point 108. The private access point 202a may, e.g., estimate ambient noise by turning off its transmitter and listening for transmissions during one or more access terminal silence intervals. In some implementations, a private access point such as the private access point 202a may determine an ambient noise value by estimating the ambient noise, and may determine a macro access terminal reverse link received power value by, e.g., subtracting the ambient noise value from an interference value such as the estimation of the ambient noise plus macro access terminal reverse link received power value.

In some implementations, a private access point such as the private access point 202a may use the estimation of the ambient noise plus macro access terminal reverse link received power value (an example of an interference value), or a macro access terminal reverse link received power value (an example of a macro access terminal interference value) to generate command(s) to send to private access terminal(s) in communication with or served by the private access point. The command(s) may cause the private access terminal(s) to adjust (e.g., reduce or increase) either the reverse link transmit power or the data rate (or both) of the private access terminals. Examples of command(s) include "UnicastReverseRateLimit" (which is used in EV-DO Rev-0 and includes a maximum data rate that an access terminal may use on the reverse link), and "PermittedPayload" (which is used in EV-DO Rev-A and includes a maximum data packet size (which determines data rate) that an access terminal may use on the reverse link). Reducing the data rate of an access terminal may generally reduce reverse link transmit power of an access terminal; while increasing the data rate of an access terminal may generally increase reverse link transmit power of an access terminal. For example, the private access point may consider the potential effect an increase in the reverse link transmit power or data rate of a private access terminal may have upon the macro access terminal or neighboring macro access point. Similarly, the private access point may determine that decreasing the data rate of one or more private access terminals, or lowering the reverse link transmit power of one or more private access terminals may contribute to an improvement in the overall interference levels within the neighboring vicinity of the private access point.

In some implementations, the estimation of the ambient noise plus macro access terminal reverse link received power value by a private access point (or the estimation of the macro access terminal reverse link received power value) may serve as a trigger to procedures to discover the identity of a macro access terminal or to initiate a hand-off of the macro access terminal communication session from the serving macro access point to the private access point.

For example, having determined the approximate macro access terminal interference value $I_{pap2-mat}$ 416 (or, e.g., the macro access terminal reverse link received power value), the private access point may estimate that the macro access terminal is within communication range (e.g., within the SNR communication range as described with respect to FIG. 2). The private access point 202b, for example, may compare the interference estimation $I_{pap2-mat}$ 416 (or, e.g., the macro access terminal reverse link received power value) to a threshold value or to a threshold percentage relating the estimated interference $I_{pap2-mat}$ 416 (or, e.g., the macro access terminal reverse link received power value) to the total noise and interference $I_{pap2}$ at the private access point 202b.

The private access point 202b may then attempt to determine if the noise and interference $I_{pap2-mat}$ 416 are originating from a macro access terminal which is authorized to communicate with the private access point 202b. Each access terminal may be identified by a unique scrambling code (e.g., a private long code mask (PLCM) or other reverse link long code) identifying the access terminal. If the access terminal 116, for example, has a PLCM derived from the mobile identification number of the access terminal 116 (e.g., international mobile subscriber identity (IMSI) or other electronic serial number), the private access point 202b may be programmed with the PLCM of the access terminal 116 (e.g., in a list of authorized access terminals).

Figure 5:
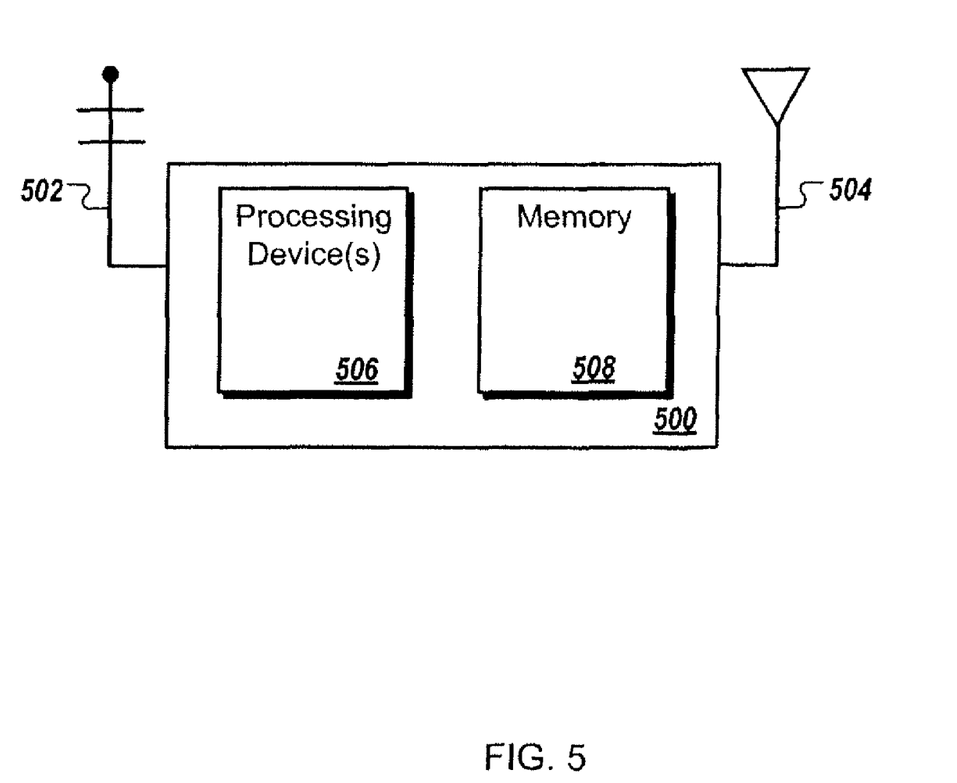
FIG. 5 is a block diagram illustrating an example private access point.

FIG. 5 is a block diagram illustrating an example implementation 500 of a private access point such as, e.g., the private access points 202a and 202b of FIG. 2. The private access point 500 includes a transmitter 502, a receiver 504, one or more processing devices 506, and a memory 508. The private access point 500 may transmit radio communications using the transmitter 502 (e.g., to send information to an access terminal or other network device) and receive communications using the receiver 504 (e.g., to receive information from an access terminal or other network device). The transmitter 502 and/or the receiver 504 may be tuned to an operating frequency of the private access point 500. The communications transmitted and received by the private access point 500, for example, may be processed using the processing device(s) 506. Information such as system settings (e.g., power setting, operating frequency, identification code(s), etc.), a list of access terminals authorized to communicate with the private access point 500, and/or identification information regarding access terminals being served by the private access point 500, for example, may be stored within the memory 508.

The techniques described herein are applicable to CDMA and non-CDMA air interface technologies in which, e.g., messages may be passed between access terminals and other network components.

The processes described herein are not limited to use with any particular hardware, software, or programming language; they may find applicability in any computing or processing environment and with any type of machine that is capable of running machine-readable instructions. All or part of the processes may be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more computer-readable storage media, for execution by, or to control the operation of, one or more data processing apparatus, e.g., a programmable processor, a computer, multiple computers, and/or programmable logic components.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a network.

Actions associated with implementing all or part of the processes may be performed by one or more programmable processing devices executing one or more computer programs to perform the functions of the processes. All or part of the processes may be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the techniques described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer (e.g., interact with a user interface element, for example, by clicking a button on such a pointing device). Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The techniques described herein may be implemented in a distributed computing system that includes a back-end component, e.g., as a data server, and/or a middleware component, e.g., an application server, and/or a front-end component, e.g., a client computer having a graphical user interface and/or a Web browser through which a user may interact with an implementation of the invention, or any combination of such back-end, middleware, or front-end components. The components of the system may be interconnected by any form or medium of digital data communication, e.g., a communication network. Examples of communication networks include a local area network ("LAN") and a wide area network ("WAN"), e.g., the Internet, and include both wired and wireless networks.

The computing system may include clients and servers. A client and server are generally remote from each other and typically interact over a communication network. The relationship of client and server arises by virtue of computer programs running on the respective computers and having a client-server relationship to each other.

Actions associated with the processes may be rearranged and/or one or more such actions may be omitted to achieve the same, or similar, results to those described herein.

Components of different implementations may be combined to form implementations not specifically set forth above. Other implementations not specifically described are also within the scope of the following claims.

What is claimed is:

1. A method, comprising:
    determining, at a first private access point in a wireless communication network, an interference value, the interference value being indicative of an interference generated at a second private access point in the wireless communication network by an access terminal, the access terminal in communication with the first private access point;
    determining, at the first private access point, a combined interference value using the interference value, the combined interference value corresponding to the second private access point; and
    sending the combined interference value to at least one of the second private access point or a private access point server.

2. The method of claim 1, further comprising:
    determining, at the first private access point, a second interference value, the second interference value being indicative of a second interference generated at the second private access point by a second access terminal, the second access terminal in communication with the first private access point; and
wherein determining the combined interference value comprises:
    determining, at the first private access point, the combined interference value using the interference value and the second interference value.

3. The method of claim 1, wherein determining the combined interference value comprises:
using the interference value as the combined interference value.

4. A method, comprising:
receiving, at a first private access point in a wireless communication network, a combined interference value from at least one of a second private access point in the wireless communication network or a private access point server, the combined interference value corresponding to the first private access point;
determining, at the first private access point, a first total interference value using the combined interference value;
measuring, at the first private access point, a second total interference value; and
determining, at the first private access point, a third interference value using the first total interference value and the second total interference value, the third interference value being indicative of a first noise.

5. The method of claim 4, further comprising:
receiving, at the first private access point, a second combined interference value from at least one of a third private access point or the private access point server, the second combined interference value corresponding to the first private access point; and
wherein determining the first total interference value comprises:
determining, at the first private access point, the first total interference value using the combined interference value and the second combined interference value.

6. The method of claim 4, wherein the combined interference value is determined at the second private access point using an interference value also determined at the second private access point, the interference value being indicative of an interference generated at the first private access point by an access terminal, the access terminal in communication with the second private access point.

7. The method of claim 4, further comprising:
determining, at the first private access point, an interference value, the interference value being indicative of an interference generated at the second private access point by an access terminal, the access terminal in communication with the first private access point;
determining, at the first private access point, a second combined interference value using the interference value, the second combined interference value corresponding to the second private access point; and
sending the second combined interference value to at least one of the second private access point or the private access point server.

8. The method of claim 4, wherein the first noise comprises a first ambient noise and a first interference power received from at least one macro access terminal, the macro access terminal in communication with a macro access point; and
wherein determining the third interference value comprises:
determining, at the first private access point, the third interference value by subtracting the first total interference value from the second total interference value.

9. The method of claim 4, further comprising:
determining, at the first private access point, an ambient noise value; and
determining, at the first private access point, a macro access terminal interference value by subtracting the ambient noise value from the third interference value.

10. The method of claim 4, further comprising:
responsively to determining the third interference value, sending a command from the first private access point to an access terminal, the access terminal being in communication with the first private access point, the command being configured to cause the access terminal to adjust a reverse link transmit power of the access terminal.

11. The method of claim 4, further comprising:
responsively to determining the third interference value, determining, at the first private access point, whether a macro access terminal is present in a communication range of the first private access point; and
if the macro access terminal is present, the macro access terminal having a communication session with a macro access point, initiating a hand-off of the communication session to the first private access point.

12. The method of claim 4, wherein determining the first total interference value comprises:
using the combined interference value as the first total interference value.

13. One or more computer-readable media configured to store instructions that are executable by one or more processing devices to perform operations comprising:
determining, at a first private access point in a wireless communication network, an interference value, the interference value being indicative of an interference generated at a second private access point in the wireless communication network by an access terminal, the access terminal in communication with the first private access point;
determining, at the first private access point, a combined interference value using the interference value, the combined interference value corresponding to the second private access point; and
sending the combined interference value to at least one of the second private access point or a private access point server.

14. The one or more computer-readable media of claim 13, wherein the operations further comprise:
determining, at the first private access point, a second interference value, the second interference value being indicative of a second interference generated at the second private access point by a second access terminal, the second access terminal in communication with the first private access point; and
wherein determining the combined interference value comprises:
determining, at the first private access point, the combined interference value using the interference value and the second interference value.

15. The one or more computer-readable media of claim 13, wherein determining the combined interference value comprises:
using the interference value as the combined interference value.

16. One or more computer-readable media configured to store instructions that are executable by one or more processing devices to perform operations comprising:
receiving, at a first private access point in a wireless communication network, a combined interference value from at least one of a second private access point in the wireless communication network or a private access point server, the combined interference value corresponding to the first private access point;
determining, at the first private access point, a first total interference value using the combined interference value;

measuring, at the first private access point, a second total interference value; and determining, at the first private access point, a third interference value using the first total interference value and the second total interference value, the third interference value being indicative of a first noise.

17. The one or more computer-readable media of claim 16, further comprising:

receiving, at the first private access point, a second combined interference value from at least one of a third private access point or the private access point server, the second combined interference value corresponding to the first private access point; and wherein determining the first total interference value comprises:

determining, at the first private access point, the first total interference value using the combined interference value and the second combined interference value.

18. The one or more computer-readable media of claim 16, wherein the combined interference value is determined at the second private access point using an interference value also determined at the second private access point, the interference value being indicative of an interference generated at the first private access point by an access terminal, the access terminal in communication with the second private access point.

19. The one or more computer-readable media of claim 16, wherein the operations further comprise:

determining, at the first private access point, an interference value, the interference value being indicative of an interference generated at the second private access point by an access terminal, the access terminal in communication with the first private access point;

determining, at the first private access point, a second combined interference value using the interference value, the second combined interference value corresponding to the second private access point; and sending the second combined interference value to at least one of the second private access point or the private access point server.

20. An apparatus comprising:
one or more processing devices; and
one or more computer-readable media configured to store instructions that are executable by one or more processing devices to perform operations comprising:

determining, at a first private access point in a wireless communication network, an interference value, the interference value being indicative of an interference generated at a second private access point in the wireless communication network by an access terminal, the access terminal in communication with the first private access point;

determining, at the first private access point, a combined interference value using the interference value, the combined interference value corresponding to the second private access point; and sending the combined interference value to at least one of the second private access point or a private access point server.

21. The apparatus of claim 20, wherein the operations further comprise:

determining, at the first private access point, a second interference value, the second interference value being indicative of a second interference generated at the second private access point by a second access terminal, the second access terminal in communication with the first private access point; and wherein determining the combined interference value comprises:

determining, at the first private access point, the combined interference value using the interference value and the second interference value.

22. The apparatus of claim 20, wherein determining the combined interference value comprises:

using the interference value as the combined interference value.

23. An apparatus comprising:
one or more processing devices; and
one or more computer-readable media configured to store instructions that are executable by one or more processing devices to perform operations comprising:

receiving, at a first private access point in a wireless communication network, a combined interference value from at least one of a second private access point in the wireless communication network or a private access point server, the combined interference value corresponding to the first private access point;

determining, at the first private access point, a first total interference value using the combined interference value;

measuring, at the first private access point, a second total interference value; and determining, at the first private access point, a third interference value using the first total interference value and the second total interference value, the third interference value being indicative of a first noise.

24. The apparatus of claim 23, wherein the operations further comprise:

receiving, at the first private access point, a second combined interference value from at least one of a third private access point or the private access point server, the second combined interference value corresponding to the first private access point; and wherein determining the first total interference value comprises:

determining, at the first private access point, the first total interference value using the combined interference value and the second combined interference value.

25. The apparatus of claim 23, wherein the combined interference value is determined at the second private access point using an interference value also determined at the second private access point, the interference value being indicative of an interference generated at the first private access point by an access terminal, the access terminal in communication with the second private access point.

26. The apparatus of claim 23, wherein the operations further comprise:

determining, at the first private access point, an interference value, the interference value being indicative of an interference generated at the second private access point by an access terminal, the access terminal in communication with the first private access point;

determining, at the first private access point, a second combined interference value using the interference value, the second combined interference value corresponding to the second private access point; and sending the second combined interference value to at least one of the second private access point or the private access point server.

* * * * *